April 5, 1927.

C. E. FOSTER 1,623,915

MEASURING INSTRUMENT

Filed April 29, 1924

Patented Apr. 5, 1927.

1,623,915

UNITED STATES PATENT OFFICE.

CHARLES EDWIN FOSTER, OF LETCHWORTH, ENGLAND.

MEASURING INSTRUMENT.

Application filed April 29, 1924, Serial No. 709,835, and in Great Britain June 29, 1923.

This invention relates to measuring and recording instruments in which there is one part turning with the pointer or indicator which moves in accordance with the physical quantity under measurement, this part being usually described as the moving system.

Heretofore in measuring instruments the movement of the indicating pointer has been damped by means of springs and friction apparatus connected directly to the spindle turning with the pointer. In the present invention however, the moving coil system is free to move independently of any damping device, other than electromagnetic and /or unavoidable air damping such as is customary with instruments of this type.

In cases where the forces generated by the physical quantity to be measured are very small the moving system is usually mounted upon conical pivots working in conical jewels or other similar seatings. In those cases where the instrument is subject to vibration or shocks which might damage the pivots or jewels and so cause serious friction errors, various resilient mountings have been used, such for instance as that described in the specification of United States Patent No. 1,375,837.

With resilient mountings of this type the whole moving system may have a definite natural free period of vibration and, if the instrument as a whole is subjected to an impressed vibration or succession of shocks having a period that is a multiple or sub-multiple of the natural free period, a condition of resonance may be established. Under such circumstances the natural vibration of the moving system may be so violent as to interfere with the normal behavior of the instrument.

The present invention has for its object to provide an instrument free from such characteristics or wherein they are reduced to a minimum, and comprises broadly a measuring instrument having a moving system of which the bearings are mounted on resilient supports, wherein the bearings of such system are provided with a mechanical damping device.

A further feature of the invention comprises a measuring instrument having a moving system provided with a mechanical frictional damping device in which the frictional element consists of a material of a soft yielding nature such as spongy rubber.

Figure 1:
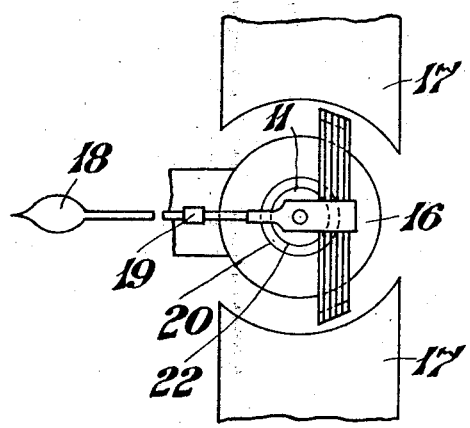
Figure 2:
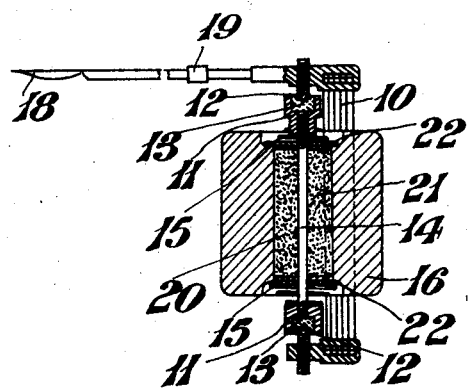

An embodiment of the invention shown as applied to the instrument set forth in the aforesaid specification No. 1,375,837 is illustrated by the accompanying drawings, wherein Figure 1 is a plan, and Figure 2 a sectional view showing the invention applied to the moving system of a measuring instrument of the D'Arsonal type having a moving coil and a permanent magnet.

In these drawings the moving coil 10 carrying the pointer, pen or indicating needle 18 has attached to it inwardly extending pivots 12. The pivots 12 bear in conical jewels 13 mounted in sockets 11 secured to a non-rotating rod or staff 14. The sockets 11 are supported by springs 15 at opposite ends of a hole 20 in a soft iron core 16 fixed in the magnetic field space between the magnet poles 17. The whole of the moving system is floating on the conical spiral springs 15. The current is passed through the coil 10 in any suitable manner such as by means of spiral spring lead connections not shown in the drawings. In order to balance the coil 10 an adjustable weight 19 is provided on the arm of the pointer 18.

The damping device is arranged in the annular space between the spindle 14 and core 16 and in the present example consists of spongy rubber 21 prevented from movement out of the hole by washers 22 of flexible material such as kid leather or other suitable material.

The soft rubber 21 acts as a retarding element modifying the vibrations of the bearings of the moving system so that it will not have any definite natural free period, but is nevertheless able to yield to the movement consequent upon shocks or vibration, and at the same time facilitate the accurate reading of the instrument.

What I claim and desire to secure by Letters Patent is:—

1. A measuring instrument having a moving system carrying a pointer, resiliently supported bearings for such system fixed on the opposite ends of a rod or staff, a supporting core, and a member consisting of a spongy rubber, the spongy rubber being supported in the core and arranged to surround the rod or staff and be in frictional contact therewith.

2. A measuring instrument having a moving system carrying a pointer, resiliently supported bearings for such system fixed on the opposite ends of a rod or staff, a supporting core, and a friction producing member, the friction producing member being supported in the core in contact with the rod or staff.

3. A measuring instrument having a moving system carrying a pointer, spring supporting bearings for such system fixed on the opposite ends of a rod or staff, a supporting core having a cylindrical hole through its centre and a friction producing member, the rod or staff passing through the centre of the hole in the core and surrounded by the friction producing device, and the bearing supporting springs resting on the opposite ends of the core.

4. A measuring instrument having a moving system carrying a pointer, spring supported bearings for such system fixed on the opposite ends of a rod or staff, a supporting core having a cylindrical hole through its centre, and a cylinder of spongy rubber, and washers of flexible material, the rod or staff passing through the centre of the hole in the core and surrounded by the cylinder of spongy rubber, and the bearing supporting springs resting on the opposite ends of the core, the washers of flexible material being arranged on the rod or staff and at opposite ends of the core and cylinder of spongy rubber.

5. A measuring instrument having a moving system carrying a pointer, spring supported bearings for such system fixed on the opposite ends of a rod or staff, a supporting core having a cylindrical hole through its centre, and a cylinder of spongy rubber, and washers of kid leather, the rod or staff passing through the centre of the hole in the core and surrounded by the cylinder of spongy rubber, and the bearing supporting springs resting on the opposite end of the core, the washers of kid leather being arranged on the rod or staff and at opposite ends of the core and of the cylinder of spongy rubber.

In witness whereof I affix my signature.

CHARLES EDWIN FOSTER.